July 5, 1927.

O. R. SAUNDERS

WEEDING MACHINE

Filed Oct. 29, 1926

O. R. Saunders
INVENTOR
BY Victor J. Evans
ATTORNEY

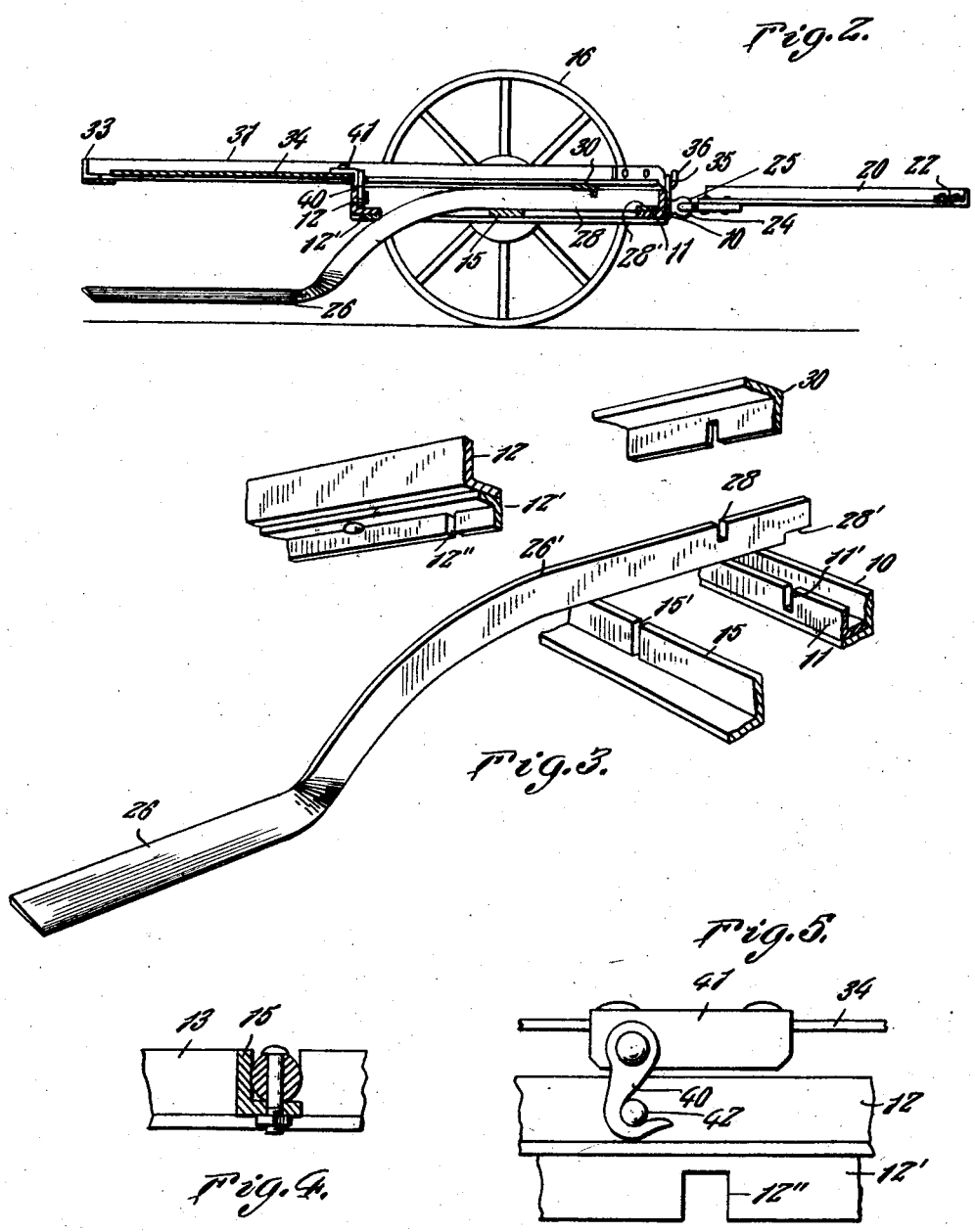

Patented July 5, 1927.

1,635,098

UNITED STATES PATENT OFFICE.

ORIEN R. SAUNDERS, OF COVE, OREGON.

WEEDING MACHINE.

Application filed October 29, 1926. Serial No. 145,039.

The object of this invention is to provide a weeding machine, especially adapted for disposing of the vines of the morning glories and other weeds,—the machine including a main frame, and weeding blades mounted therein in a particular manner, the mounting means permitting of the prompt removal of the blades or any of them, when it is desired to change the spacing, or substitute other knives differently formed, of different size, or having sharper edges.

A further object is to provide an approximately rectangular frame mounting ground wheels and mounting notched transverse bars adapted to engage portions of the blades, said blades being retained by an upper transverse bar held in position by the pivoted frame.

A further object is to provide blades having free ends extending rearwardly, at an angle with and adjacent to the surface of the ground when the frame is in horizontal position, said blades each including a shank twisted to a vertical position and engaging the aforesaid slots, or notches.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 2 is a view in vertical section, on line 2—2 of Figure 1.

Figure 3 is a perspective view of one of the blades, with fragmentary portions of the blade mounting and retaining devices.

Figures 4 and 5 are detail views of construction described below.

Figure 1:
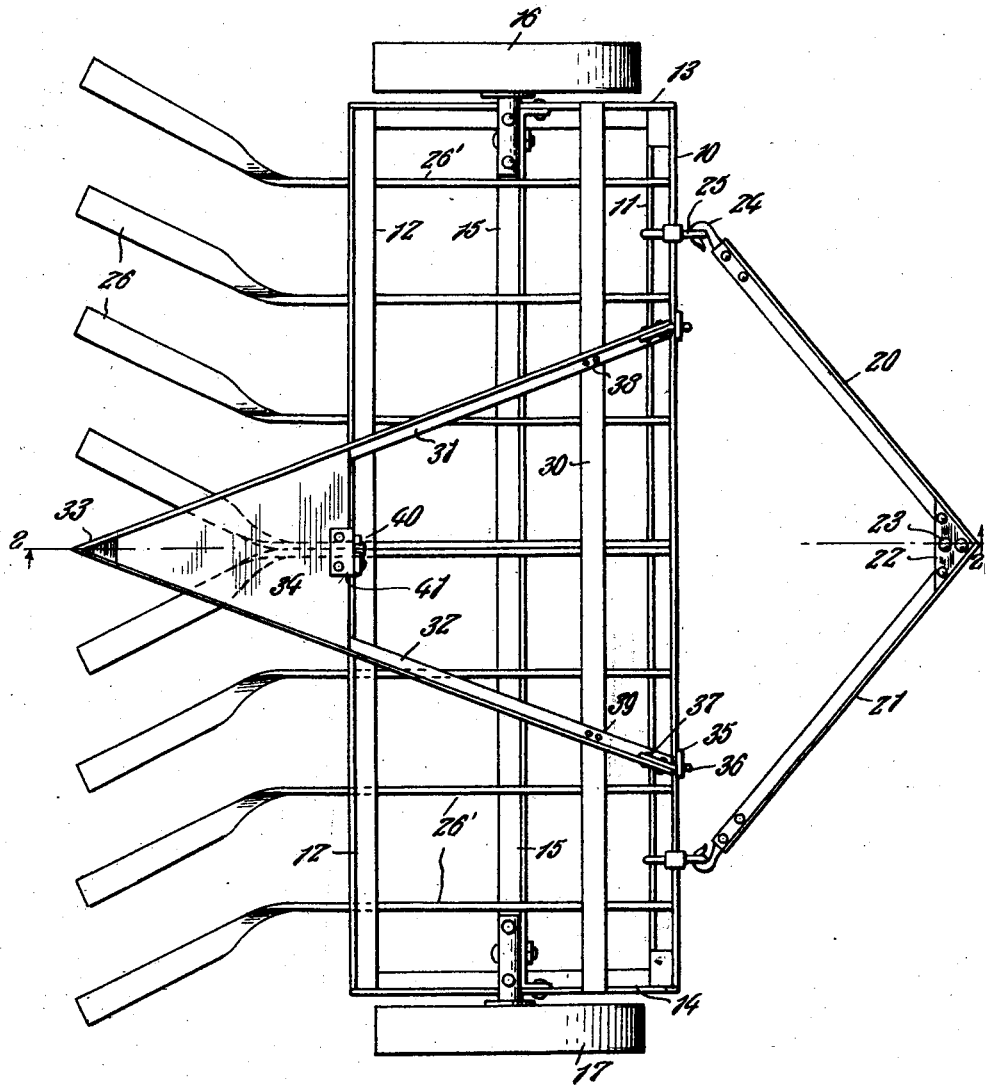
Figure 1 is a top plan view of the machine.

In carrying out the invention, I provide a main frame comprising a front bar of channel form built up of angle bars 10 and 11, as shown in Figure 3, the frame including a rear bar 12 of angle construction, and end angle bars 13 and 14.

An approximately central bar extending transversely of the machine, and parallel with bars 10, 11 and 12, is designated 15, this bar likewise being of angle form in cross section, and ground wheels 16 and 17 are carried by axial members mounted as illustrated with reference to the main frame.

A draft device includes the angle bars 20 and 21 connected by a corner plate 22, at the forward point where bars 20 and 21 converge. Plate 22 is apertured at 23 for connection with any suitable element thru which draft is to be applied. Bars 20 and 21 carry a hook such as 24 for connection with engaging devices 25 secured to the main frame.

The blades each include a rear end portion 26 adapted to travel under the surface of the ground, or at about the surface, and being at an angle therewith in two directions. The blades on one side portion of the machine are deflected toward that side, and the blades on the other side of the machine are deflected in an opposite direction. These blades each include a shank portion extending vertically, these portions being designated 26′ and being notched at 28 for engagement by bar 30, referred to below. Figure 3 shows the detachable connection of the blades with the bar 15 and the built up bar comprising the elements 10 and 11, but more especially with element 11 which is notched as shown at 11′, while bar 15 is notched as indicated at 15′. The extreme end of the shank 26 of each blade fits within the channel between the flanges of bars 10 and 11, this structure last indicated being termed a channel bar. The end portion, at its lower edge 28′ is adapted to rest on the lower flange of bar 11, and the edge of the shank also rests on the horizontal flange of bar 15.

On the lower flange of angle 12, an angle bar 12′ is secured, in the position shown in Figure 3, and this bar 12′ is notched at 12″, and the notches are engaged by the upper edge portion of shank 26′, so that said shank is engaged by notched devices from opposite sides or edges of the shank, and is retained when in the position of Figure 1 by means of a bar 30 extending across the machine and parallel with the bars 10, 11, 12 and 15.

Any or all of the blades can therefore be removed when bar 30 is elevated for freeing the shank portions of the blades.

Converging bars 31 and 32 are connected with each other at the point 33, and a small platform or the like may be mounted between the converging portions, this platform being designated 34. Eye members 35 mounted on frame member 10 provide means for detachable connection between bars 31, 32 and the frame, but more especially for swinging connection, the engaging devices 36 passing thru these elements 35, and being secured to bars 31 and 32 as shown at 37.

The upward movement of the frame comprising bars 31 and 32, lifts bar 30, because of connection therewith at the points 38 and 39. Hook 40 pivoted on bracket 41 on element 34 engages pin 42 on rear bar 12 of the main frame, and holds the frame 31, 32 in operative position.

Having described the invention what is claimed is:—

1. In a machine of the class described, a frame including front and rear transverse bars, weeding blades mounted in said frame and extending longitudinally of the machine and under the rear bar, bars extending parallel with said front and rear bars and having their ends connected with the frame, the blades including shanks engaging the bars mounted in the frame, and an upper bar bearing on the shanks and retaining the elements thus engaged in fixed relation.

2. In a machine of the class described, a frame including front and rear bars extending transversely of the machine and including bars within said frame, substantially parallel with the bars first named and spaced therefrom and from each other, blades mounted in the frame and extending rearwardly therefrom, said blades including shank portions engaging the bars positioned between the front and rear bars of the frame, a bar extending across the shank portions of the blades and bearing on their upper edges, a pivoted frame connected for swinging movement with reference to the front bar and bearing on the bar extending across the shanks of the blades, and means for securing the pivoted frame to the frame first named, at a point spaced from the point of swinging connection.

3. In a machine of the class described, a frame, wheels for carrying the frame, weeding blades mounted in the frame, said blades including shank portions, means carried by the under side of the rear portion of the frame for spacing and engaging the shanks, from their upper edges, said shanks being notched near their ends, and a bar extending transversely of the frame for engaging the shanks from their upper edges, and at the notched portions thereof.

4. In a machine of the class described, a frame, wheels for carrying the frame, weeding blades mounted in the frame, said blades including shank portions, means carried by the under side of the rear portion of the frame for spacing and engaging the shanks and blades, from the upper edges of the shanks, a bar extending transversely of the frame and having its lower edge engaging the shanks on their upper portions, and additional means including a channel structure for spacing and engaging the ends of the shanks of the blades.

In testimony whereof I affix my signature.

ORIEN R. SAUNDERS.